US012767824B2

(12) United States Patent
Xu

(10) Patent No.: US 12,767,824 B2
(45) Date of Patent: Oct. 20, 2026

(54) FLAME RETARDANT THERMOPLASTIC POLYCARBONATE COMPOSITIONS AND FILMS MADE THEREFROM

(71) Applicant: SABIC GLOBAL TECHNOLOGIES, B.V., Bergen op Zoom (NL)

(72) Inventor: Yuzhen Xu, Shanghai (CN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 223 days.

(21) Appl. No.: 18/720,710

(22) PCT Filed: Dec. 19, 2022

(86) PCT No.: PCT/IB2022/062485
§ 371 (c)(1),
(2) Date: Jun. 17, 2024

(87) PCT Pub. No.: WO2023/119128
PCT Pub. Date: Jun. 29, 2023

(65) Prior Publication Data

US 2025/0051572 A1 Feb. 13, 2025

(30) Foreign Application Priority Data

Dec. 20, 2021 (EP) .................................... 21215907

(51) Int. Cl.

| | |
|---|---|
| ***C08L 83/10*** | (2006.01) |
| ***C08K 13/02*** | (2006.01) |
| ***C08L 69/00*** | (2006.01) |
| *C08K 3/32* | (2006.01) |
| *C08K 3/34* | (2006.01) |
| *C08K 5/526* | (2006.01) |
| *C08K 5/5399* | (2006.01) |

(52) U.S. Cl.
CPC .............. *C08L 83/10* (2013.01); *C08K 13/02* (2013.01); *C08L 69/00* (2013.01); *C08K 2003/329* (2013.01); *C08K 2003/343* (2013.01); *C08K 5/526* (2013.01); *C08K 5/5399* (2013.01); *C08K 2201/005* (2013.01); *C08K 2201/014* (2013.01); *C08L 2201/02* (2013.01); *C08L 2203/16* (2013.01); *C08L 2205/025* (2013.01); *C08L 2205/035* (2013.01); *C08L 2207/53* (2013.01)

(58) Field of Classification Search
CPC .. C08G 73/106; C08G 77/448; C08G 77/455; C08K 13/02; C08K 2003/329; C08K 2003/343; C08K 2201/005; C08K 2201/014; C08K 3/34; C08K 5/523; C08K 5/526; C08K 5/5399; C08L 2201/02; C08L 2203/16; C08L 2205/025; C08L 2205/035; C08L 2207/53; C08L 27/18; C08L 69/00; C08L 79/08; C08L 83/10
See application file for complete search history.

(56) References Cited

U.S. PATENT DOCUMENTS

| | | | |
|---|---|---|---|
| 4,154,775 | A | 5/1979 | Axelrod |
| 8,389,648 | B2 | 3/2013 | Adoni et al. |
| 8,841,367 | B2 | 9/2014 | Zheng et al. |
| 9,458,315 | B2 | 10/2016 | Li et al. |
| 2007/0048527 | A1 | 3/2007 | Agarwal |
| 2007/0049706 | A1 | 3/2007 | Siripurapu et al. |

FOREIGN PATENT DOCUMENTS

| | | | |
|---|---|---|---|
| EP | 0295561 | A2 | 12/1988 |
| WO | 2020041677 | A1 | 2/2020 |

OTHER PUBLICATIONS

International Search Report of the ISA/EPO mailed Feb. 21, 2023 for International Application No. PCT/IB2022/062485 filed Dec. 19, 2022, 3 pages.
Written Opinion of the ISA/EPO mailed Feb. 21, 2023 for International Application No. PCT/IB2022/062485 filed Dec. 19, 2022, 5 pages.

*Primary Examiner* — Lawrence D Ferguson
(74) *Attorney, Agent, or Firm* — CANTOR COLBURN LLP

(57) ABSTRACT

A thermoplastic composition including 40 to 70 weight percent of a polycarbonate; 15 to 50 weight percent of a polycarbonate-polysiloxane copolymer; 4 to 8 weight percent of a polyetherimide-polysiloxane copolymer; 1 to 8 weight percent of a mineral filler; and 2 to 5 weight percent of a phosphorous-containing flame retardant; wherein the weight percentages are based on the total weight of the thermoplastic composition.

15 Claims, No Drawings

FLAME RETARDANT THERMOPLASTIC POLYCARBONATE COMPOSITIONS AND FILMS MADE THEREFROM

CROSS-REFERENCE TO RELATED APPLICATIONS

This application is a National Stage application of PCT/IB2022/062485, filed Dec. 19, 2022, which claims priority to and the benefit of European Application 21215907.3, filed on Dec. 20, 2021, the content of both of which are incorporated by reference in their entirety.

BACKGROUND

Polycarbonate (PC) is widely used in film extrusion for electrical and electronic (EE) insulation applications. This film shows excellent mechanical properties, high temperature resistance, and offers ease of thermoforming, die cutting, folding and bending. For EE applications, high flame retardant properties are desired. With increasingly stricter regulations on brominated materials, potassium perfluorobutane sulfonate (Rimar salt), and environmental protection, current EE marketing trends demand chlorine and bromine free EE films with minimal amount of potassium perfluorobutane sulfonate. Additionally, flame retardant polycarbonate is demanded to have similar performance with previous brominated PC, especially in flame retardance performance: V0/VTM0 at 2 mil to 20 mil (0.05 millimeters (mm) to 0.5 mm). Accordingly, there is a need for a flame retardant polycarbonate material that is free of bromine and chlorine flame retardants, with minimal to no potassium perfluorobutane sulfonate, which can achieve a V0 or VTM0 flame retardant rating as determined by UL94 at a thickness of 0.05 mm to 0.5 mm.

SUMMARY

Described herein is a thermoplastic composition including 40 to 70 weight percent of a polycarbonate; 15 to 50 weight percent of a polycarbonate-polysiloxane copolymer; 4 to 8 weight percent of a polyetherimide-polysiloxane copolymer; 1 to 8 weight percent of a mineral filler; and 2 to 5 weight percent of a phosphorous-containing flame retardant; all based on the total weight of the thermoplastic composition.

DETAILED DESCRIPTION

A thermoplastic composition comprising a polycarbonate, a polycarbonate-polysiloxane copolymer, a polyetherimide-polysiloxane copolymer, a mineral filler, and a phosphorous-containing flame retardant has been found to exhibit desirable flame retardance, mechanical properties, and other characteristics. The thermoplastic composition can have a flame retardance rating of V0 at a thickness of 0.43 millimeters according to UL94. The thermoplastic composition can also have a flame retardance rating of V0 at a thickness of 0.38 millimeters according to UL94. The thermoplastic composition can have a flame retardance rating of VTM0 at a thickness of 0.17 millimeters according to UL94. The composition can have a flame retardancy rating of V2, or V1, or V0, at a thickness of 0.5, or 0.43 millimeters according to UL94; or VTM2, or VTM1, or VTM0, at a thickness of 0.25 mm, or 0.12 mm, determined in accordance with UL94. For example, the composition can have a flame retardancy rating of V0 at a thickness of 0.5, or 0.43 millimeters according to UL94; or VTM0 at a thickness of 0.25 mm, or 0.12 mm, determined in accordance with UL94.

A 3.2-millimeter thick molded Notched Izod Impact (NII) bar including the composition can have a notched Izod impact strength of 750 Joules/meter (J/m) or greater, or 850 J/m or greater, determined in accordance with ASTM D256-10(2018) at 23 degrees Celsius. A flat, 3.2-millimeter thick molded tensile bar formed from the composition has a Heat Deflection Test (HDT) temperature of 114 degrees Celsius (° C.) or greater, determined at 1.82 MPa per ASTM D648-2018.

As used herein, the terms "polycarbonate" and "polycarbonate resin" mean compositions having repeating structural carbonate units of formula (1):

(1)

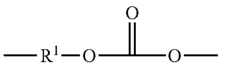

in which at least 60 percent of the total number of $R^1$ groups are aromatic organic radicals and the balance thereof are aliphatic or alicyclic. Each $R^1$ can be an aromatic organic radical, for example a radical of formula (2): $A^1$-$Y^1$-$A^2$- (2); wherein each of $A^1$ and $A^2$ is a monocyclic divalent aryl radical and $Y^1$ is a bridging radical having one or two atoms that separate $A^1$ from $A^2$. One atom can separate $A^1$ from $A^2$. Illustrative non-limiting examples of radicals of this type are —O—, —S—, —S(O)—, —S($O_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ can be a hydrocarbon group or a saturated hydrocarbon group such as methylene, cyclohexylidene, or isopropylidene. The polycarbonate can be free of siloxane repeat units. The polycarbonate can be a homopolymer.

Polycarbonates can be produced by the interfacial reaction or melt reaction of dihydroxy compounds having the formula HO—$R^1$—OH, which includes dihydroxy compounds of formula (3): HO-$A^1$-$Y^1$-$A^2$-OH (3); wherein $Y^1$, $A^1$ and $A^2$ are as described herein. Also included are bisphenol compounds of formula (4), wherein $R^a$ and $R^b$ each represent a halogen atom or a monovalent hydrocarbon group and can be the same or different; p and q are each independently integers of 0 to 4; and $X^a$ represents one of the groups of formula (5), wherein $R^c$ and $R^d$ each independently represent a hydrogen atom or a monovalent linear or cyclic hydrocarbon group and $R^e$ is a divalent hydrocarbon group.

(4)

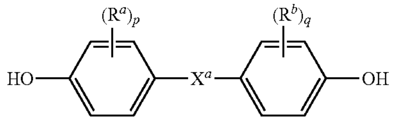

(5)

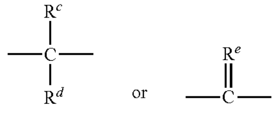

or

Some illustrative, non-limiting examples of suitable dihydroxy compounds include the following: resorcinol, hydroquinone, 4,4'-dihydroxybiphenyl, 1,6-dihydroxynaphthalene, 2,6-dihydroxynaphthalene, bis(4-hydroxyphenyl) methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 1,1-bis (hydroxyphenyl)cyclopentane, 1,1-bis(4-hydroxyphenyl) cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl) adamantine, (alpha, alpha'-bis(4-hydroxyphenyl)toluene, bis (4-hydroxyphenyl)acetonitrile, 2,2-bis(3-methyl-4-hydroxyphenyl)propane, 2,2-bis(3-ethyl-4-hydroxyphenyl) propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl) propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing compounds.

Specific examples of the types of bisphenol compounds that can be represented by formula (3) include 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, and 1,1-bis(4-hydroxy-t-butylphenyl) propane. Combinations comprising at least one of the foregoing dihydroxy compounds can also be used.

Branched polycarbonates are also useful, as well as blends of a linear polycarbonate and a branched polycarbonate. The branched polycarbonates can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris(4-hydroxyphenyl)ethane (THPE), isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 to 2.0 weight percent (wt. %), based on the total weight of the dihydroxy compound and the branching agent. All types of polycarbonate end groups are contemplated as being useful in the polycarbonate composition, provided that such end groups do not significantly affect desired properties of the thermoplastic compositions.

"Polycarbonates" and "polycarbonate resins" as used herein further includes blends of polycarbonates with other copolymers comprising carbonate chain units. A specific suitable copolymer is a polyester carbonate, also known as a copolyester-polycarbonate. Such copolymers further contain, in addition to recurring carbonate chain units of formula (1), repeating units of formula (6):

(6)

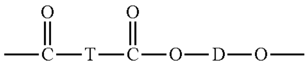

wherein D is a divalent radical derived from a dihydroxy compound, and can be, for example, a $C_{2-10}$ alkylene radical, a $C_{6-20}$ alicyclic radical, a $C_{6-20}$ aromatic radical or a polyoxyalkylene radical in which the alkylene groups contain 2 to 6 carbon atoms, for example, 2, 3, or 4 carbon atoms; and T is a divalent radical derived from a dicarboxylic acid, and can be, for example, a $C_{2-10}$ alkylene radical, a $C_{6-20}$ alicyclic radical, a $C_{6-20}$ alkyl aromatic radical, or a $C_{6-20}$ aromatic radical.

In an embodiment, D is a $C_{2-6}$ alkylene radical. D can be derived from an aromatic dihydroxy compound of formula (7):

(7)

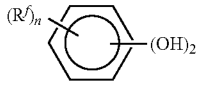

wherein each $R^f$ is independently a $C_{1-10}$ hydrocarbon group and n is 0 to 4. The halogen is usually bromine. Examples of compounds that can be represented by formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone; or combinations comprising at least one of the foregoing compounds.

Examples of aromatic dicarboxylic acids that can be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is 10:1 to 0.2:9.8. In an embodiment, D is a $C_{2-6}$ alkylene radical and T is p-phenylene, m-phenylene, naphthalene, a divalent cycloaliphatic radical, or a mixture thereof. This class of polyester includes the poly(alkylene terephthalates).

In an embodiment, the polycarbonate is a linear homopolymer derived from bisphenol A, in which each of $A^1$ and $A^2$ is p-phenylene and $Y^1$ is isopropylidene.

Suitable polycarbonates can be manufactured by processes such as interfacial polymerization and melt polymerization. The polycarbonate resins can be prepared by interfacial polymerization. Rather than utilizing the dicarboxylic acid per se, the reactive derivatives of the acid, such as the corresponding acid halides, for example, the acid dichlorides and the acid dibromides, can be employed. Thus, for example, instead of using isophthalic acid, terephthalic acid, or mixtures thereof, isophthaloyl dichloride, terephthaloyl dichloride, and mixtures thereof can be employed.

Blends and/or mixtures of more than one polycarbonate can also be used. For example, a high flow and a low flow polycarbonate can be blended together.

Polycarbonate can be present in an amount of 40 to 70 wt. %, or 41 to 62 wt. %, 42 to 61 wt. %, or 50 to 60 wt. %, based on the total weight of the composition. The polycarbonate can be different from the polycarbonate-polysiloxane copolymer in that it can be free of a siloxane repeat unit.

A polycarbonate-polysiloxane copolymer comprises polycarbonate blocks and polydiorganosiloxane blocks. The polycarbonate blocks in the copolymer comprise repeating structural units of formula (1) as described herein, for example, wherein $R^1$ is of formula (2) as described herein. These units can be derived from reaction of dihydroxy compounds of formula (3) as described herein. The dihydroxy compound can be bisphenol A, in which each of $A^1$ and $A^2$ is p-phenylene and $Y^1$ is isopropylidene.

The polydiorganosiloxane blocks comprise repeating structural units of formula (8) (sometimes referred to herein as 'siloxane'):

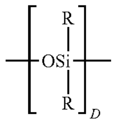

(8)

wherein each occurrence of R is same or different, and is a $C_{1-13}$ monovalent organic radical. For example, R can be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{10}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. The copolymer can include one or more of the foregoing R groups.

The value of D in formula (8) can vary widely depending on the type and relative amount of each component in the thermoplastic composition, the desired properties of the composition, and like considerations. D can have an average value of 2 to 1,000, for example, 2 to 500 or 5 to 100. D can have an average value of 10 to 75, or 40 to 60. Where D is of a lower value, e.g., less than 40, it can be desirable to use a larger amount of the polycarbonate-polysiloxane copolymer. Where D is of a higher value, e.g., greater than 40, a lower amount of the polycarbonate-polysiloxane copolymer can be used. The amount of dihydroxy polydiorganosiloxane can be selected so as to produce a copolymer comprising 1 to 75 wt. %, or 1 to 50 wt. %, or 30 to 45 wt. % polydimethylsiloxane, or an equivalent molar amount of another polydiorganosiloxane. In an embodiment, the copolymer comprises 5 to 40 wt. %, or 5 to 25 wt. %, polydimethylsiloxane, or an equivalent molar amount of another polydiorganosiloxane, with the balance being polycarbonate. In an embodiment, the copolymer can comprise 20 wt. % siloxane.

A combination of a first and a second (or more) polycarbonate-polysiloxane copolymers can be used, wherein the average value of D of the first copolymer is less than the average value of D of the second copolymer.

In an embodiment, the polydiorganosiloxane blocks are provided by repeating structural units of formula (9):

(9)

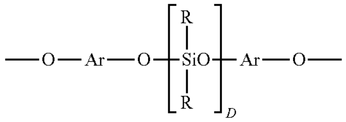

wherein D is as defined herein; each R can be the same or different, and is as defined herein; and Ar can be the same or different, and is a substituted or unsubstituted $C_6$-$C_{30}$ arylene radical, wherein the bonds are directly connected to an aromatic moiety. Suitable Ar groups in formula (9) can be derived from a $C_6$-$C_{30}$ dihydroxyarylene compound, for example, a dihydroxyarylene compound of formula (3), (4), or (7). Combinations comprising at least one of the foregoing dihydroxyarylene compounds can also be used. Specific examples of suitable dihydroxyarlyene compounds are 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulphide), and 1,1-bis(4-hydroxy-t-butylphenyl) propane. Combinations comprising at least one of the foregoing dihydroxy compounds can also be used.

Such units can be derived from the corresponding dihydroxy compound of the following formula (10):

(10)

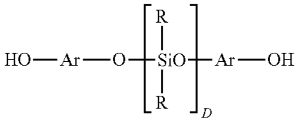

wherein Ar and D are as described herein. Such compounds are further described in U.S. Pat. No. 4,746,701 to Kress et al. Compounds of this formula can be obtained by the reaction of a dihydroxyarylene compound with, for example, an alpha, omega-bisacetoxypolydiorangonosiloxane under phase transfer conditions.

The polydiorganosiloxane blocks can comprise repeating structural units of formula (11):

(11)

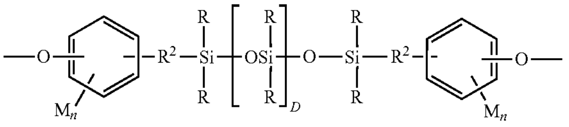

wherein R and D are as defined herein. $R^2$ in formula (11) is a divalent $C_2$-$C_8$ aliphatic group. Each M in formula (11) can be the same or different, and can be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1, 2, 3, or 4.

M can be hydrogen, an alkyl group such as methyl, ethyl, or propyl, an alkoxy group such as methoxy, ethoxy, or propoxy, or an aryl group such as phenyl or tolyl; $R^2$ can be a dimethylene, trimethylene or tetramethylene group; and R can be a $C_{1-8}$ alkyl, cyanoalkyl, or aryl such as phenyl. In an embodiment, R is methyl, or a mixture of methyl and or a mixture of methyl and phenyl. In an embodiment, M is methoxy, n is one, $R^2$ is a divalent $C_1$-$C_3$ aliphatic group, and R is methyl.

These units can be derived from the corresponding dihydroxy polydiorganosiloxane (12):

(12)

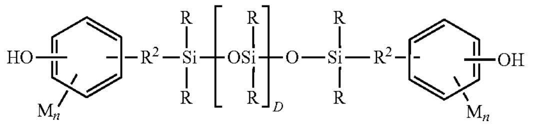

wherein R, D, M, $R^2$, and n are as described herein.

Such dihydroxy polysiloxanes can be made by effecting a platinum catalyzed addition between a siloxane hydride of formula (13):

(13)

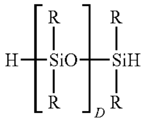

wherein R and D are as previously defined, and an aliphatically unsaturated monohydric phenol. Suitable aliphatically unsaturated monohydric phenols included, for example, eugenol, 2-alkylphenol, 4-allyl-2-methylphenol, 4-allyl-2-phenylphenol, 4-allyl-2-t-butoxyphenol, 4-phenyl-2-phenylphenol, 2-methyl-4-propylphenol, 2-allyl-4,6-dimethylphenol, 2-allyl-6-methoxy-4-methylphenol and 2-allyl-4,6-dimethylphenol. Mixtures comprising at least one of the foregoing can also be used.

The polycarbonate-polysiloxane copolymer can be present in an amount of 15 to 50 wt. %, or 15 to 49 wt. %, 15 to 48 wt. %, or 15 to 47 wt. %, or 30 to 46 wt. %, or 30 to 45 wt. %, 30 to 44 wt. %, or 30 to 40 wt. %, based on the total weight of the composition.

The composition comprises a polyetherimide-polysiloxane. The polyetherimide-polysiloxane can contain a siloxane repeat unit as described above and more than 1, or 10 to 1,000 or more, or 10 to 500 structural units, of formula (14):

(14)

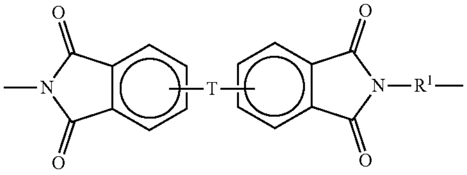

wherein T is —O— or a group of the formula —O—Z—O— wherein the divalent bonds of the —O— or the —O—Z—O— group are in the 3,3', 3,4', 4,3-, or the 4,4-positions, and wherein Z and $R^1$ are defined below, can contain polyimide structural units of formula (15).

(15)

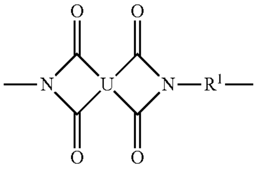

Z includes, but is not limited to, divalent radicals of formulas (16):

(16)

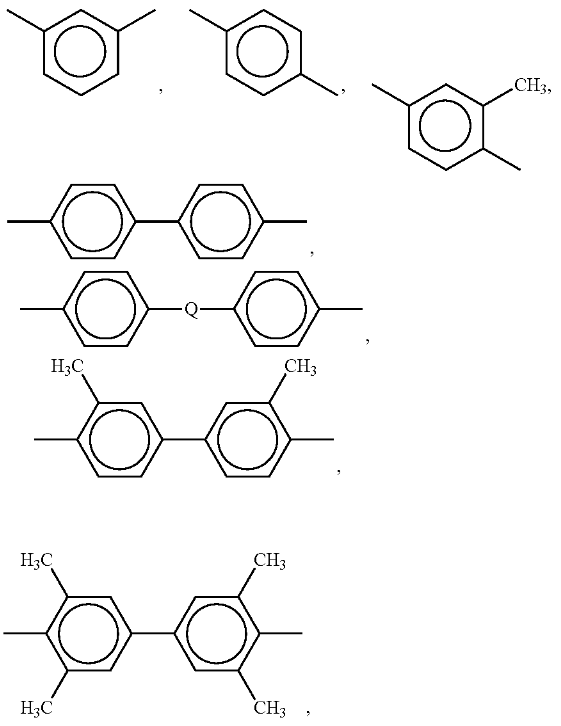

-continued

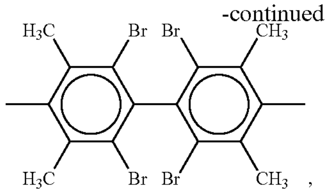

, and

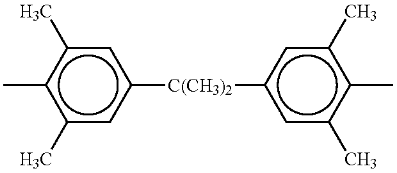

wherein Q includes, but is not limited to, a divalent moiety comprising —O—, —S—, —C(O)—, $—SO_2—$, —SO—, $—C_yH_{2y}—$ (y being an integer from 1 to 5), and halogenated derivatives thereof, including perfluoroalkylene groups.

$R^1$ includes but is not limited to substituted or unsubstituted divalent organic radicals such as: aromatic hydrocarbon radicals having 6 to 20 carbon atoms and halogenated derivatives thereof; straight or branched chain alkylene radicals having 2 to 20 carbon atoms; cycloalkylene radicals having 3 to 20 carbon atoms; or divalent radicals of formula (17):

(17)'

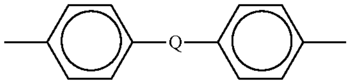

wherein Q is defined as herein.

U includes, but is not limited to, radicals of formula (18).

(18)

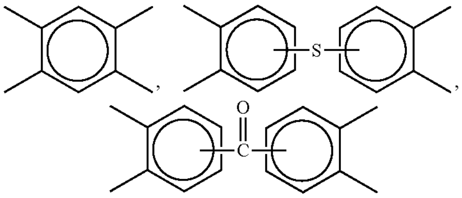

The polyetherimide can be prepared by any of a variety of methods, including the reaction of an aromatic bis(ether anhydride) of formula (19) with an organic diamine of formula (20):

(19)

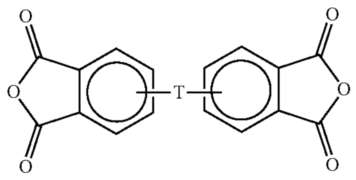

(20)

$$H_2N—R^1—NH_2$$

wherein $R^1$ and T are defined in relation to formulas (15) and (14), respectively.

The polyetherimide-siloxane copolymer employed contains repeating groups of formulas (21a and 21b):

(21a)

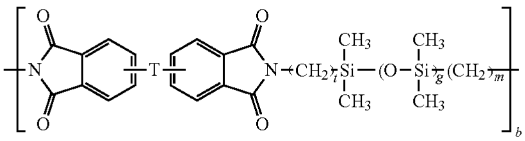

and (21b)

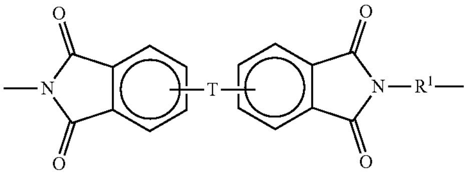

wherein b in formula (21a) is an integer greater than 1, for example, 10 to 10,000 or more; T described herein in relation to formula (14); $R^1$ is described herein in relation to formula (15); t and m independently are integers from 1 to 10; and g is an integer from 1 to 40.

The polyetherimide-siloxane copolymer can similarly be prepared by various methods, including the reaction of an aromatic bis(ether anhydride) of formula (19) with two or more organic diamines of formula (20) and formula (22):

(22)

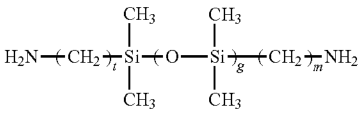

where t, m, and g, are defined as described herein in relation to formulas (21a) and (21b).

The two organic diamines, including a diamine of formula (20) and the amine-terminated organosiloxane of formula (22), can be physically mixed prior to reaction with the bis(ether anhydride)(s), thus forming a substantially random copolymer. In an embodiment, block or alternating copolymers can be formed by forming prepolymers or sequential addition of reactants.

The amine-terminated organosiloxanes can have the formula (22), in which t and m are independently 1 to 5, and g is 5 to 25; or where t and m are each 3, and which have a molecular weight distribution such that g has an average value of 9 to 20.

The polyimides of formula (15) and the polyetherimides of formula (14) can be copolymerized with other polymers such as polysiloxanes, polyesters, polycarbonates, polyacrylates, fluoropolymers, and the like. In an embodiment, the polysiloxane is of the formula (23):

(23)

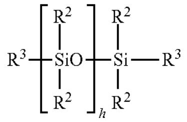

where $R^2$ is the same or different $C_{(1-14)}$ monovalent hydrocarbon radical or $C_{(1-14)}$ monovalent hydrocarbon radical substituted with radicals inert during polycondensation or displacement reactions. The integer h can be 1 to 200. The reactive end group $R^3$ can be any functionality capable of reacting with the reactive end-groups on the polyimide of formula (15) or the polyetherimide of formula (14). Reactive end groups include, for example, halogen atoms; lower dialkylamino groups of 2 to 20 carbon atoms; lower acyl groups of 2 to 20 carbon atoms; lower alkoxy of 2 to 20 carbon atoms; and hydrogen. The siloxane oligomer can be those in which $R^3$ comprises a primary amino group, an acetyl group, or a chlorine atom.

The diamine component of the polyetherimide-siloxane copolymers can contain 10 to 50 mole percent (mole %) of the amine-terminated organosiloxane of formula (22) and 50 to 80 mole % of the organic diamine of formula (20). For example, the diamine component can contain 25 to 40 mole %, of the amine-terminated organosiloxane, based upon the total mole % of the copolymer. Examples of polyetherimide-siloxanes can be found, for example, in U.S. Pat. Nos. 4,690,997, 4,808,686, and 5,280,085.

In an embodiment, a total amount of polysiloxane from both the polycarbonate-polysiloxane copolymer and the polyetherimide-siloxane copolymer is 1 wt. % to 5 wt. %, or 1.5 to 4 wt. %, or 2 to 4 wt. %, based on a total weight of the composition.

The composition also includes at least one mineral filler. A non-exhaustive list of examples of mineral fillers suitable for use in the composition include talc including fibrous, modular, needle shaped, lamellar talc, or the like; mica; wollastonite; silicates and silica powders such as aluminum silicate (mullite), synthetic calcium silicate, zirconium silicate, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; glass spheres such as hollow and solid glass spheres, silicate spheres, cenospheres, aluminosilicate (armospheres), or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like. Combinations of fillers can also be used. The mineral filler can comprise talc. As used herein, the term "mineral filler" includes any synthetic and naturally occurring reinforcing agents for polycarbonate and polycarbonate blends that that provides balanced physical properties and does not degrade the polycarbonate or polycarbonate blend.

The mineral filler can have an average particle size of less than or equal to 5.0 micrometer (μm), or less than or equal to 3.0 μm, or less than or equal to 2.5 μm. For example, the mineral filler can be talc having an average particle size of less than or equal to 5.0 μm, or less than or equal to 3.0 μm, or less than or equal to 2.5 μm.

The mineral filler can be present in an amount of 1 to 8 wt. %, based on the total weight of the composition. Within this range the amount of mineral filler can be greater than or equal to 3 wt. %. Also within this range the amount of mineral filler can be less than or equal to 7 wt. %.

Potassium perfluorobutane sulfonate (Rimar salt) can be present in an amount of 0 to less than 0.1 wt. %, or 0 to less than 0.05 wt. %, 0 to less than 0.01 wt. %, or 0 wt. % based on the total weight of the composition. A chlorine-containing flame retardant can be present in an amount of 0 to less than 0.1 wt. %, or 0 to less than 0.05 wt. %, 0 to less than 0.01 wt. %, or 0 wt. % based on the total weight of the composition. A bromine-containing flame retardant can be present in an amount of 0 to less than 0.1 wt. %, or 0 to less than 0.05 wt. %, 0 to less than 0.01 wt. %, or 0 wt. % based on the total weight of the composition. In an embodiment, the composition does not include potassium perfluorobutane sulfonate, the composition does not include a chlorine-containing flame retardant, and the composition does not include a bromine-containing flame retardant. In other words, the composition can be free of potassium perfluorobutane sulfonate, the composition can be free of a chlorine-containing flame retardant, and the composition can be free of a bromine-containing flame retardant. Any one or a combination of potassium perfluorobutane sulfonate, potassium perfluorobutane sulfonate, and a chlorine-containing flame retardant may not be present.

The composition can also include a phosphorous-containing flame retardant. The phosphorous-containing flame retardant can comprise, for example, at least one of a phosphorous-containing oxy-acid, an organophosphorus flame retardant, or an aromatic phosphate ester. The composition can comprise 2 to 5 wt. %, or 2.5 to 4.5 wt. %, or 3 to 4 wt. %, of the phosphorous-containing flame retardant, based on the total weight of the composition.

A phosphorous-containing oxy-acid can comprise a multi-protic phosphorus-containing oxy-acid having formula (24):

$$H_mP_tO_n \quad (24)$$

where m and n are each 2 or greater and t is 1 or greater. Examples of the acids of formula (24) include, but are not limited to, acids represented by the following formulas: $H_3PO_4$, $H_3PO_3$, and $H_3PO_2$.

The phosphorous-containing flame retardant can comprise at least one of the following: phosphoric acid, phosphorous acid, hypophosphorous acid, hypophosphoric acid, phosphinic acid, phosphonic acid, metaphosphoric acid, hexametaphosphoric acid, thiophosphoric acid, fluorophosphoric acid, difluorophosphoric acid, fluorophosphorous acid, difluorophosphorous acid, fluorohypophosphorous acid, or fluorohypophosphoric acid. Acids and acid salts, for example, sulphuric acid, sulphites, mono zinc phosphate, mono calcium phosphate, mono natrium phosphate, and the like, can be used. The phosphorous-containing flame retardant can be selected so that it can be effectively combined with the mineral filler to produce a synergistic effect and a balance of properties, such as flow and impact, in the polycarbonate or polycarbonate blend. A weight ratio of acid or acid salt, e.g., phosphorous acid, to mineral filler, e.g., talc, present in the thermoplastic composition can be 0.0001:1 to 0.3:1, or 0.001:1 to 0.3:1, or 0.01:1 to 0.03:1.

Organophosphorus flame retardants can be used. Organophosphorus compounds include organic compounds having at least one phosphorus-nitrogen bond.

Organophosphorus compounds containing at least one phosphorus-nitrogen bond includes phosphazenes, phosphorus ester amides, phosphoric acid amides, phosphonic acid amides, phosphinic acid amides, and tris(aziridinyl) phosphine oxide. Phosphazenes (25) and cyclic phosphazenes (26):

(25)

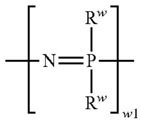

(26)

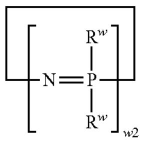

in particular can used, wherein w1 is 3 to 10,000 and w2 is 3 to 25, for example, 3 to 7, and each $R^w$ is independently a $C_{1-12}$ alkyl, alkenyl, alkoxy, aryl, aryloxy, or polyoxyalkylene group. In the foregoing groups at least one hydrogen atom of these groups can be substituted with a group having an N, S, O, or F atom, or an amino group. For example, each $R^w$ can be a substituted or unsubstituted phenoxy, an amino, or a polyoxyalkylene group. Any given $R^w$ can further be a crosslink to another phosphazene group. Exemplary crosslinks include bisphenol groups, for example bisphenol A groups. Examples include phenoxy cyclotriphosphazene, octaphenoxy cyclotetraphosphazene decaphenoxy cyclopentaphosphazene, and the like. A combination of different phosphazenes can be used. A number of phosphazenes and their synthesis are described in H. R. Allcook, "Phosphorus-Nitrogen Compounds" Academic Press (1972), and J. E. Mark et al., "Inorganic Polymers" Prentice-Hall International, Inc. (1992).

The organophosphorus compounds can comprise bisphenol A bis(diphenyl phosphate), triphenyl phosphate, resorcinol bis(diphenyl phosphate), tricresyl phosphate, or a combination thereof.

Aromatic phosphate esters include esters of the formula $(GO)_3P{=}O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, p-tolyl bis(2,5,5'-trimethylhexyl) phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

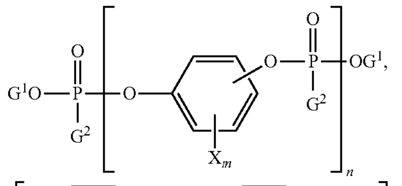

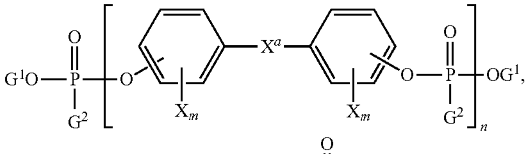

and

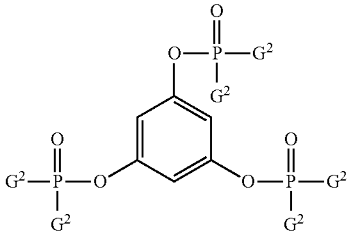

wherein each $G^1$ is independently a hydrocarbon having 1 to 30 carbon atoms; each $G^2$ is independently a hydrocarbon or hydrocarbonoxy having 1 to 30 carbon atoms; each $X^a$ is as defined above; each X is independently a hydrogen or a halogen; m is 0 to 4, and n is 1 to 30. Examples of suitable di- or polyfunctional aromatic phosphorus-containing compounds include resorcinol tetraphenyl diphosphate (RDP), the bis(diphenyl) phosphate of hydroquinone and the bis(diphenyl) phosphate of bisphenol-A, respectively, their oligomeric and polymeric counterparts, and the like.

In an embodiment, the composition can include bisphenol-A bis(diphenyl phosphate), a phosphazene flame retardant, phosphorous acid, or a combination thereof. In an embodiment, the composition can include bisphenol-A bis (diphenyl phosphate), a phosphazene flame retardant, and phosphorous acid.

Other fillers and/or reinforcing agents can be used if desired, as long as they do not further degrade the composition. For example, optional fillers and reinforcing agents include reinforcing organic fibrous fillers formed from organic polymers capable of forming fibers such as poly (ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like.

The composition can also include an anti-drip agent. Anti-drip agents include a fibril forming or non-fibril forming fluoropolymer such as polytetrafluoroethylene (PTFE). The anti-drip agent can be encapsulated by a rigid copolymer as described herein, for example SAN. PTFE encapsulated in SAN is known as TSAN. Encapsulated fluoropolymers can be made by polymerizing the encapsulating polymer in the presence of the fluoropolymer, for example, in an aqueous dispersion. TSAN can provide significant advantages over PTFE, in that TSAN can be more readily dispersed in the composition. A suitable TSAN can comprise, for example, 50 wt. % PTFE and 50 wt. % SAN, based on the total weight of the encapsulated fluoropolymer. The SAN can comprise, for example, 75 wt. % styrene and 25 wt.

% acrylonitrile, based on the total weight of the copolymer. In an embodiment, the fluoropolymer can be pre-blended in some manner with a second polymer, such as for, example, an aromatic polycarbonate resin or SAN to form an agglomerated material for use as an anti-drip agent. Either method can be used to produce an encapsulated fluoropolymer. The anti-drip agent is present in an amount of 0.10 to 1 wt. %, or 0.20 to 0.80 wt. %, or 0.30 to 0.70 wt. %, based on the total weight of the composition.

The compositions described herein can comprise a primary antioxidant or "stabilizer" (e.g., a hindered phenol and/or secondary aryl amine) and, optionally, a secondary antioxidant (e.g., a phosphate and/or thioester). Suitable antioxidant additives include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis [methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants can be used in amounts of 0.01 to 1 parts by weight (pbw), or 0.02 to 0.8 pbw, or 0.05 to 0.5 pbw, based on 100 parts polycarbonate resin, and any optional aromatic vinyl copolymer and/or impact modifier.

The compositions described herein can also comprise, for example, a heat stabilizer additive; a light stabilizer and/or ultraviolet light (UV) absorbing additive; a plasticizer, lubricant, and/or mold release agent additive; an antistatic agent; a colorant such as a pigment and/or dye additive; or a combination thereof. Suitable heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. The term "antistatic agent" refers to monomeric, oligomeric, or polymeric materials that can be processed into polymer resins and/or sprayed onto materials or articles to improve conductive properties and overall physical performance.

A thermoplastic composition can comprise 40 to 70 wt. % of a polycarbonate; 15 to 50 wt. % of a polycarbonate-polysiloxane copolymer; 4 to 8 wt. % of a polyetherimide-polysiloxane copolymer; 1 to 8 wt. % of a mineral filler; and 2 to 5 wt. % of a phosphorous-containing flame retardant; wherein the weight percentages are based on the total weight of the thermoplastic composition. A total amount of polysiloxane from both the polycarbonate-polysiloxane copolymer and the polyetherimide-polysiloxane copolymer can be 2 to 4 wt. %, based on a total weight of the thermoplastic composition. The composition can comprise a fluoropolymer, for example, a styrene-acrylonitrile encapsulated polytetrafluoroethylene. The composition can have a flame retardancy rating of V0 at a thickness of 0.5, or 0.43 mm according to UL94; VTM0 at a thickness of 0.25 mm, or 0.12 mm, determined in accordance with UL94; or a combination thereof. The mineral filler can comprise talc, or talc having an average particle size less than or equal to 2.5 micrometers. The mineral filler can be present in an amount of 3 to 7 wt. %, based on the total weight of the composition. A weight ratio of the phosphorous acid to the mineral filler can be 0.01:1 to 0.03:1. A 3.2-mm thick molded Notched Izod Impact (NII) bar comprising the composition can have a notched Izod impact strength of 750 J/m or greater, or 850 J/m or greater, determined in accordance with ASTM D256-10(2018) at 23° C.; a flat, 3.2-mm thick molded tensile bar formed from the composition can have a Heat Deflection Test (HDT) temperature of 114° C. or greater, determined at 1.82 MPa per ASTM D648-2018; or a combination thereof. The composition may not comprise potassium perfluorobutane sulfonate. The composition may not comprise a chlorine-containing flame retardant. The composition may not comprise a bromine-containing flame retardant. A film can comprise the thermoplastic composition. The film can have a thickness of 0.1 to 0.6 mm.

The composition can comprise 50 to 60 wt. % of the polycarbonate; 30 to 40 wt. % of the polycarbonate-polysiloxane copolymer; 4 to 8 wt. % of the polyetherimide-polysiloxane copolymer; 1 to 8 wt. % of the mineral filler; and 2 to 5 wt. % of the phosphorous-containing flame retardant.

The polycarbonate can comprise a tris(4-hydroxyphenyl) ethane branched polycarbonate resin. The flame retardant can comprise a phosphazene flame retardant. The composition can comprise phosphorous acid, a phosphite stabilizer, carbon black, and an antioxidant stabilizer.

The polycarbonate can comprise an aromatic polycarbonate having a weight average molecular weight of greater than 30,000 grams per mole. As used herein the weight average molecular weight can be based on polystyrene standards. The phosphorous-containing flame retardant can comprise a phosphazene flame retardant, bisphenol-A bis (diphenyl phosphate), or a combination thereof. The fluoropolymer can comprise a styrene-acrylonitrile encapsulated polytetrafluoroethylene. The composition can comprise phosphorous acid, and a phosphite stabilizer.

Where a foam is desired, suitable blowing agents include, for example, low boiling halohydrocarbons and those that generate carbon dioxide; blowing agents that are solid at room temperature and when heated to temperatures higher than their decomposition temperature, generate gases such as nitrogen, carbon dioxide, or ammonia gas, such as azodicarbonamide, metal salts of azodicarbonamide, 4,4' oxybis (benzenesulfonylhydrazide), sodium bicarbonate, ammonium carbonate, or the like; or combinations comprising at least one of the foregoing blowing agents.

The thermoplastic compositions can be manufactured by any suitable method, for example, powdered polycarbonate resin and mineral filler can first be blended, optionally with other fillers in a HENSCHEL™ high speed mixer or other suitable mixer/blender. Other low shear processes including but not limited to hand mixing can also accomplish this blending. The blend is then fed into the throat of a twin-screw extruder via a hopper. In an embodiment, one or more of the components can be incorporated into the composition by feeding directly into the extruder at the throat and/or downstream through a sidestuffer. Such additives can also be compounded into a masterbatch with a desired polymeric resin and fed into the extruder. The extruder can be operated at a temperature higher than that which causes the composition to flow. The extrudate can be immediately quenched in a water batch and pelletized. The pellets, so prepared, when cutting the extrudate can be one-fourth inch long or less as desired. Such pellets can be used for subsequent molding, shaping, or forming.

The thermoplastic composition can be converted to articles using thermoplastic processes such as film and sheet extrusion, injection molding, gas-assist injection molding, extrusion molding, compression molding and blow molding. Film and sheet extrusion processes can include and are not limited to melt casting, blown film extrusion and calendering. Co-extrusion and lamination processes can be employed to form composite multi-layer films or sheets. Single or multiple layers of coatings can further be applied to the single or multi-layer substrates to impart additional properties such as scratch resistance, ultra violet light resistance, aesthetic appeal, etc. Coatings can be applied through standard application techniques such as rolling, spraying, dipping, brushing, or flow-coating. Film and sheet can be prepared by casting a solution or suspension of the composition in a suitable solvent onto a substrate, belt or roll followed by removal of the solvent. The film can have a thickness of 0.01 to 1 mm, 0.05 to 0.7 mm, or 0.1 to 0.6 mm.

The thermoplastic composition can be converted to multiwall sheet comprising a first sheet having a first side and a second side, wherein the first sheet comprises a thermoplastic polymer, and wherein the first side of the first sheet is disposed upon a first side of a plurality of ribs; and a second sheet having a first side and a second side, wherein the second sheet comprises a thermoplastic polymer, wherein the first side of the second sheet is disposed upon a second side of the plurality of ribs, and wherein the first side of the plurality of ribs is opposed to the second side of the plurality of ribs.

The films and sheets described herein can further be thermoplastically processed into shaped articles via forming and molding processes including but not limited to thermoforming, vacuum forming, pressure forming, injection molding and compression molding. Multi-layered shaped articles can also be formed by injection molding a thermoplastic resin onto a single or multi-layer film or sheet substrate.

Those skilled in the art will also appreciate that curing and surface modification processes including and not limited to heat-setting, texturing, embossing, corona treatment, flame treatment, plasma treatment, vacuum deposition, or a combination thereof can further be applied to the articles disclosed herein to alter surface appearances and impart additional functionalities to the articles.

Accordingly, an embodiment of the disclosure relates to articles, sheets and films prepared from the compositions disclosed herein.

EXAMPLES

The compositions are further illustrated by the following non-limiting examples, which were prepared from the components set forth in Table 1.

TABLE 1

| Material | Description | Source |
|---|---|---|
| PC-1 | Aromatic polycarbonate; weight average molecular weight = 36,500 grams per mole (g/mol), C001DP | SABIC |
| PC-2 | Aromatic polycarbonate; weight average molecular weight = 30,000 g/mol, C023A | SABIC |
| PC-3 | Tris(4-hydroxyphenyl)ethane (THPE) branched polycarbonate (PC) resin, C019C | SABIC |
| FST | Isophthalic acid-terephthalic acid-resorcinol (ITR)/Siloxane Block/Arylene para-cumylphenol (PCP) endcap (Diaryl carbonate (DAC)-Resorcinol-Siloxane-2,2-bis(4-hydroxyphenyl) propane (BPA) Polyester-Polycarbonate) | SABIC |
| PC-siloxane-1 | LEXAN ™ EXL transparent polycarbonate-siloxane copolymer resin (contains 6 wt. % siloxane) | SABIC |
| PC-siloxane-2 | LEXANTM EXL opaque polycarbonate-siloxane copolymer resin (contains 20 wt. % siloxane) | SABIC |
| PEI-siloxane-1 | SILTEM ™ 1500 polyetherimide-siloxane copolymer (contains 40 wt. % siloxane) | SABIC |
| PEI-siloxane-2 | SILTEM ™ 1700 polyetherimide-siloxane copolymer (contains 20 wt. % siloxane) | SABIC |
| Rimar salt | Potassium perfluorobutane sulfonate | Lanxess |
| KSS | Potassium diphenylsulphon-3-sulphonate | Arichem LLC |
| BPADP | Bisphenol-A bis(diphenyl phosphate), NcendX P-30 | Albemarle |
| Phosphazene FR | Fushimi Rabitle FP-110T (Phosphazene flame retardant) | Fushimi Pharmaceutical Co., Ltd |
| TSAN | Styrene-acrylonitrile encapsulated polytetrafluoroethylene, contains 50% PTFE | SABIC |
| Mineral filler | Magnesium silicate hydrate, Jetfine 3CA | Luzenac |
| Phosphorous acid | $H_3PO_3$ solution (45% in $H_2O$) | Quaron |
| CB | Carbon black, M800 | Twin Star International Co., Ltd. |
| Phosphite stabilizer | Tris(2,4-di-tert-butylphenyl)phosphite | Ciba |
| Antioxidant stabilizer | Hindered phenol antioxidant, IRGANOX ™ 1076 (octadecyl-3-[3,5-di-tert-butyl-4-hydroxyphenyl]propionate]) | BASF |

All testing, except flammability, followed ASTM protocols. Exemplary testing is listed in Table 2.

TABLE 2

| | Standard | Testing Conditions |
|---|---|---|
| Melt Volume Rate (MVR), Melt Mass-flow Rate (MFR) | ASTM D 1238-2010 | 300° C., 1.2 kilograms (kg) |
| Uniaxial Tensile test | ASTM D 638-2014 | 50 millimeters (mm)/minute (min) |
| Heat Deflection Temperature (HDT) | ASTM D 648-2018 | 1.8 megapascals (MPa), 3.2 mm |
| Notched Izod Impact (NII) | ASTM D 256-10(2018) | 5 lbf (22.2 newtons (N)) 23° C., 3.2 mm |
| Vicat softening temperature (VST) | ASTM D 1525-2017 | 50 N, 120° C./hour (h) |
| Multiaxial Impact (MAI) | ASTM D3763-2018 | 23° C., 3.3 meters per second (s); 4 inch (10.16 cm) diameter, 3.2 mm thick disc |

Flammability testing was conducted under UL 94 regulation and the total flame-out-time is calculated at a specified thickness. Table 3 shows the criteria for V0, V1, and V2 under UL94 standards. Some materials, due to, for example, thinness, distort, shrink, or a combination thereof may be consumed up to the holding clamp when subjected to testing. Such materials may be tested in accordance with the test procedure in thin material burning test: VTM0, VTM1, and VTM2. Table 4 shows the criteria for VTM0, VTM1 and VTM2 under UL94 standards.

TABLE 3

| Criteria conditions | V-0 | V-1 | V-2 |
|---|---|---|---|
| Afterflame time for each individual specimen $t_1$ or $t_2$ | ≤10 s | ≤30 s | ≤30 s |
| Total afterflame time for any condition set ($t_1$ plus $t_2$ for the 5 specimens) | ≤50 s | ≤250 s | ≤250 s |
| Afterflame plus afterglow time for each individual specimen after the second flame application ($t_2 + t_3$) | ≤30 s | ≤60 s | ≤60 s |
| Afterflame or afterglow of any specimen up to the holding clamp | No | No | No |
| Cotton indicator ignited by flaming particles or drops | No | No | Yes |

TABLE 4

| Criteria conditions | VTM-0 | VTM-1 | VTM-2 |
|---|---|---|---|
| Afterflame time for each individual specimen $t_1$ or $t_2$ | ≤10 s | ≤30 s | ≤30 s |
| Total afterflame time for any condition set ($t_1$ plus $t_2$ for the 5 specimens) | ≤50 s | ≤250 s | ≤250 s |
| Afterflame plus afterglow time for each individual specimen after the second flame application ($t_2 + t_3$) | ≤30 s | ≤60 s | ≤60 s |

TABLE 4-continued

| Criteria conditions | VTM-0 | VTM-1 | VTM-2 |
|---|---|---|---|
| Afterflame or afterglow of any specimen up to the 125 mm mark | No | No | No |
| Cotton indicator ignited by flaming particles or drops | No | No | Yes |

Typical compounding and molding procedures are described as follows. Polycarbonate powders, which may contain different ratio of low-flow (LF) polycarbonate (PC) (LF PC, melt flow rate (MFR): 3.5 grams (g)/10 minutes (mins)), normal-flow (NF) PC (NF PC, MFR: 7 g/10 mins), polyetherimide-siloxane copolymer powder, and polycarbonate-siloxane copolymer resin, were pre-blended with the inorganic mineral filler, phosphate-containing flame retardant, phosphorous acid, encapsulated fluoropolymer, and thermal stabilizer. The pre-blended PC powders and copolymers were extruded using a twin extruder. The extruded pellets were molded in different shapes for mechanical tests. Films were extruded in a film extrusion line at different thicknesses of 0.125 millimeters (mm), 0.25 mm, 0.43 mm and 0.5 mm. Formulations and results are provided in Tables 5-14, in which amounts are in weight percentage.

TABLE 5

| Component | Ex. 1 | Ex. 2 | Ex. 3 | Ex. 4 |
|---|---|---|---|---|
| PC-1 | 47.175 | 47.425 | 47.125 | 27.125 |
| PC-2 | 47 | 47 | 47 | 47 |
| PC-siloxane-1 | | | | 20 |
| Rimar salt | 0.5 | 0.1 | 0.1 | 0.1 |
| KSS | | | 0.3 | 0.3 |
| Mineral filler | 4.8 | 4.8 | 4.8 | 4.8 |
| Phosphorous acid | 0.115 | 0.115 | 0.115 | 0.115 |
| TSAN | 0.35 | 0.5 | 0.5 | 0.5 |
| Phosphite stabilizer | 0.06 | 0.06 | 0.06 | 0.06 |
| Total amount of siloxane in the composition | — | — | — | 1.2 |

TABLE 6

| | | Ex. 1 | Ex. 2 | Ex. 3 | Ex. 4 |
|---|---|---|---|---|---|
| MVR | MVR 300° C./1.2 kg 300 second (s) Dwell (g/10 min) | 5.5 | 5.2 | 4.7 | 6.2 |
| | MVR 300° C./1.2 kg 1080 s Dwell (g/10 min) | 5.9 | 5.9 | 5.0 | 6.6 |
| | MVR shift (%) | 8.7 | 12.7 | 8.3 | 5.9 |
| Notched Izod Impact @ 23° C. | Impact Strength - average (J/m) | 907 | 1110 | 888 | 1140 |
| | Impact Strength - Rate of shear deformation (RSD) (%) | 5.3 | 13.2 | 2.6 | 17.1 |
| | Impact Strength - Std (J/m) | 47.7 | 147 | 22.9 | 196 |
| | Ductility (%) | 100 | 100 | 100 | 100 |
| UL94 | UL94 VTM @ 0.12 mm | VTM0 | VTM1 | VTM2 | VTM2 |
| | UL94 VTM @ 0.25 mm | VTM0 | VTM1 | VTM2 | VTM2 |
| | UL94 VTM @ 0.43 mm | V0 | F | F | F |
| | UL94 VTM @ 0.71 mm by injection molding | V0 | V2 | V1 | F |

TABLE 7

| Component | Ex. 5 | Ex. 6 | Ex. 7 | Ex. 8 |
|---|---|---|---|---|
| PC-siloxane-1 | 83 | 83 | 83 | 83 |
| FST | — | — | 10 | — |
| PC-1 | 11.34 | 11.14 | 1.14 | 6.02 |
| PEI-siloxane-1 | 5 | 5 | 5 | 5 |
| KSS | 0.1 | 0.3 | 0.3 | 0.3 |
| TSAN | 0.5 | 0.5 | 0.5 | 0.5 |
| Mineral filler | — | — | — | 5 |
| Phosphorous acid | — | — | — | 0.12 |
| Phosphite stabilizer | — | — | — | 0.06 |
| Total amount of siloxane in the composition | 6.98 | 6.98 | 6.98 | 6.98 |

TABLE 8

| | | Ex. 5 | Ex. 6 | Ex. 7 | Ex. 8 |
|---|---|---|---|---|---|
| MVR | MVR 300° C./ 1.2 kg 300 s Dwell (g/10 min) | 6.9 | 7.3 | 7.2 | 6.8 |
| | MVR 300° C./ 1.2 kg 1080 s Dwell (g/10 min) | 7.4 | 8.4 | 8.7 | 7.8 |
| | MVR shift (%) | 6.8 | 15.7 | 20.2 | 15.6 |
| MAI @ 23° C. | MAI 0.5 mm Energy to failure (J) | 6.6 | 7.0 | 4.9 | 5.8 |
| UL94 | UL94 VTM @ 0.12 mm | F | F | F | F |
| | UL94 VTM @ 0.25 mm | F | F | F | F |
| | UL94 VTM @ 0.43 mm | F | F | F | F |
| | UL94 VTM @ 0.5 mm | F | F | F | F |

TABLE 9

| Component | Ex. 9 | Ex. 10 | Ex. 11 | Ex. 12 | Ex. 13 |
|---|---|---|---|---|---|
| PC-siloxane-1 | 83 | 83 | 83 | 83 | 83 |
| PC-1 | 11.36 | 6.24 | 7.24 | 3.24 | 1.02 |
| PEI-siloxane-1 | 5 | 5 | 4 | 8 | — |
| PEI-siloxane-2 | — | — | — | — | 10 |
| Rimar salt | 0.08 | 0.08 | 0.08 | 0.08 | |
| KSS | — | — | — | — | 0.3 |
| TSAN | 0.5 | 0.5 | 0.5 | 0.5 | 0.5 |
| Mineral filler | — | 5 | 5 | 5 | 5 |
| Phosphorous acid | — | 0.12 | 0.12 | 0.12 | 0.12 |
| Phosphite stabilizer | 0.06 | 0.06 | 0.06 | 0.06 | 0.06 |
| Total amount of siloxane in the composition | 6.98 | 6.98 | 6.58 | 8.18 | 6.98 |

TABLE 10

| | | Ex. 9 | Ex. 10 | Ex. 11 | Ex. 12 | Ex. 13 |
|---|---|---|---|---|---|---|
| MVR | MVR 300° C./1.2 kg 300 s Dwell (g/10 min) | 7.0 | 10.5 | 10.0 | 3.2 | 10.9 |
| | MVR 300° C./1.2 kg 1080 s Dwell (g/10 min) | 8.6 | 14.4 | 14.0 | — | 15.3 |
| | MVR shift (%) | 23.7 | 37.2 | 40.0 | — | 40.6 |
| MAI @ 23° C. | MAI 0.5 mm Energy to failure (%) | 6.8 | 5.2 | 5.6 | 5.8 | 4.5 |
| UL94 | UL94 VTM @ 0.12 mm | F | F | F | F | F |
| | UL94 VTM @ 0.25 mm | F | F | F | F | F |
| | UL94 VTM @ 0.43 mm | F | F | F | F | F |
| | UL94 VTM @ 0.5 mm | F | F | F | F | F |

TABLE 11

| Component | Ex. 14 | Ex. 15 | Ex. 16 | Ex. 17 |
|---|---|---|---|---|
| PC-siloxane-1 | — | — | 83 | 83 |
| PC-1 | 44.24 | 40.32 | 2.35 | 2.35 |
| PC-2 | 40 | 40 | — | — |
| PEI-siloxane-1 | — | — | 5 | 5 |
| PEI-siloxane-2 | 10 | 10 | — | — |
| Rimar salt | 0.08 | — | — | — |
| BPADP | — | 4 | 4 | |
| Phosphazene FR | — | — | — | 4 |
| TSAN | 0.5 | 0.5 | 0.5 | 0.5 |
| Mineral filler | 5 | 5 | 5 | 5 |
| Phosphorous acid | 0.12 | 0.12 | 0.09 | 0.09 |
| Phosphite stabilizer | 0.06 | 0.06 | 0.06 | 0.06 |
| Total amount of siloxane in the composition | 2 | 2 | 6.98 | 6.98 |

TABLE 12

| | | Ex. 14 | Ex. 15 | Ex. 16 | Ex. 17 |
|---|---|---|---|---|---|
| MVR | MVR 300° C./ 1.2 kg 300 s Dwell (g/10 min) | 4.0 | 9.2 | 6.2 | 8.4 |
| | MVR 300° C./ 1.2 kg 1080 s Dwell (g/10 min) | — | — | 7.8 | — |
| | MVR shift (%) | — | — | 25.7 | — |
| MAI @ 23° C. | MAI 0.5 mm Energy to failure (%) | 6.5 | 6.9 | 5.8 | 5.4 |
| UL94 | UL94 VTM @ 0.12 mm | F | F | V0 | V0 |
| | UL94 VTM @ 0.25 mm | F | F | V0 | V0 |
| | UL94 VTM @ 0.43 mm | F | F | V0 | V0 |
| | UL94 VTM @ 0.5 mm | F | F | V0 | V0 |

TABLE 13

| Component | Ex. 18 | Ex. 19 | Ex. 20 |
|---|---|---|---|
| PC-3 | 55.96 | 56.46 | 25.96 |
| PC-2 | — | — | 30 |
| PC-siloxane-1 | 30 | 30 | 30 |
| PEI-siloxane-1 | 5 | 5 | 5 |
| Phosphazene FR | 3 | 3 | 3 |
| TSAN | 0.5 | — | 0.5 |
| Mineral filler | 5 | 5 | 5 |
| Phosphorous acid | 0.12 | 0.12 | 0.12 |
| Phosphite stabilizer | 0.06 | 0.06 | 0.06 |
| CB | 0.3 | 0.3 | 0.3 |
| Antioxidant stabilizer | 0.06 | 0.06 | 0.06 |
| Total amount of siloxane in the composition | 3.8 | 3.8 | 3.8 |

TABLE 14

| | | Ex. 18 | Ex. 19 | Ex. 20 |
|---|---|---|---|---|
| UL94 | UL94 VTM @ 0.4 mm | V0 | V2 | V0 |
| | UL94 VTM @ 0.5 mm | V0 | V2 | V0 |
| | UL94 VTM @ 0.12 mm | VTM0 | VTM0 | VTM0 |
| | UL94 VTM @ 0.25 mm | VTM0 | VTM2 | VTM0 |
| MVR | MVR 300° C./ 1.2 kg 300 s (g/10 min) | 2.2 | 2.8 | 4.0 |
| | MVR 300° C./ 1.2 kg 1080 s (g/10 min) | 2.4 | 2.9 | 4.4 |
| | MVR shift (%) | 0.1 | 0.1 | 0.1 |

TABLE 14-continued

| | | Ex. 18 | Ex. 19 | Ex. 20 |
|---|---|---|---|---|
| MAI @ 23° C. | MAI 0.5 mm Energy to failure - Avg (J) | 9.1 | 9.6 | 7.0 |
| HDT | 7.82 MPa 3.2 mm (° C.) | 114.2 | 117.1 | 116.2 |
| Mechanical-Izod Impact - ASTM D256-10(2018), 23° C. | Impact Strength, Avg (J/m) | 865 | 940 | 957 |
| | Impact Strength, Std (J/m) | 110 | 152 | 147 |
| Mechanical-Izod Impact - ASTM D256-10(2018), −20° C. | Impact Strength, Avg (J/m) | 162 | 150 | 152 |
| | Impact Strength, Std (J/m) | 8.7 | 21.9 | 4.9 |
| Mechanical-Izod Impact - ASTM D256-10(2018), −40° C. | Impact Strength, Avg (J/m) | 133 | 121 | 118 |
| | Impact Strength, Std (J/m) | 5.8 | 8.0 | 3.6 |

Examples 16-20 exhibit a desirable combination of flame retardancy and mechanical performance (e.g., MAI) without inclusion of Rimar salt. Formulations can include varying amounts or ranges of polycarbonate (Examples 16 and 17 (83 wt. %), Examples 18 and 19 (55.96-56.46 wt. %), and Example 20 (25.96 wt. %)). Inclusion of TSAN can provide excellent flame retardancy (Examples 16-18 and 20).

Formulations and testing results of Examples 21-23, which demonstrate that inclusion of both mineral filler and phosphorous-containing flame retardant, in the disclosed amounts, provide synergistic effects in combination with polycarbonate, polycarbonate-polysiloxane copolymer, and polyetherimide-polysiloxane copolymer, in the disclosed amounts, are detailed in Tables 15 and 16.

TABLE 15

| Component | Ex. 21 | Ex. 22 | Ex. 23 |
|---|---|---|---|
| PC-2 | 60.63 | 60.63 | 55.51 |
| PC-siloxane-1 | 25 | — | — |
| PC-siloxane-2 | — | 25 | 25 |
| PEI-siloxane-1 | 6.25 | 6.25 | 6.25 |
| BPADP | 7.5 | 7.5 | 7.5 |
| TSAN | 0.5 | 0.5 | 0.5 |
| Mineral filler | — | — | 5 |
| Phosphorous acid | — | — | 0.12 |
| Phosphite stabilizer | 0.06 | 0.06 | 0.06 |
| Antioxidant stabilizer | 0.06 | 0.06 | 0.06 |
| Total amount of siloxane in the composition | 4 | 7.5 | 7.5 |

TABLE 16

| | | Ex. 21 | Ex. 22 | Ex. 23 |
|---|---|---|---|---|
| UL94 | UL94 VTM @ 0.4 mm | F | V0 | V0 |
| | UL94 VTM @ 0.5 mm | V1 | V0 | V0 |
| | UL94 VTM @ 0.8 mm | V0 | V0 | V0 |
| | UL94 VTM @ 0.25 mm | F | F | VTM0 |
| MVR | MVR 300° C./1.2 kg 300 s (g/10 min) | 12.466 | 8.635 | 7.792 |
| | MVR 300° C./1.2 kg 1080 s (g/10 min) | 14.617 | 10.665 | 9.238 |
| | MVR shift (%) | 17.2 | 23.5 | 18.6 |

TABLE 16-continued

| | | Ex. 21 | Ex. 22 | Ex. 23 |
|---|---|---|---|---|
| HDT | 7.82 MPa 3.2 mm, Avg (° C.) | 98.6 | 97.8 | 98.4 |
| | 7.82 MPa 3.2 mm, Std (° C.) | 0.2 | 0.2 | 0.4 |
| Mechanical-Izod Impact - ASTM D256-10(2018), 23° C. | Impact Strength, Avg (J/m) | 789 | 872 | 831 |
| | Impact Strength, Std (J/m) | 24.7 | 21.5 | 52.5 |
| Mechanical-Izod Impact - ASTM D256-10(2018), −40° C. | Impact Strength, Avg (J/m) | 123 | 393 | 149 |
| | Impact Strength, Std (J/m) | 5.42 | 41.6 | 4.43 |
| Tensile Elongation at Break | Avg (%) | 101.3 | 87.0 | 94.3 |
| | Std (%) | 5.2 | 31 | 15 |
| Tensile Modulus of Elasticity | Avg (MPa) | 2365 | 2226 | 2598 |
| | Std (MPa) | 12.2 | 8.4 | 29.9 |
| Tensile Stress at Break | Avg (MPa) | 63.8 | 54.8 | 52.4 |
| | Std (MPa) | 1.50 | 11.7 | 14.2 |
| Tensile Stress at Yield | Avg (MPa) | 62.1 | 59.0 | 60.1 |
| | Std (MPa) | 0.636 | 0.420 | 0.241 |

Example 21, which included 7.5 wt. % phosphorous-containing flame retardant but not mineral filler, did not provide acceptable results for flame retardance rating according to UL94 at 0.4 mm or 0.25 mm, had an undesirably low HDT temperature of 98.6° C., and had a notched Izod impact strength less than that of Examples 18-20. Example 22, which included 7.5 wt. % phosphorous-containing flame retardant but not mineral filler, did not provide acceptable results for flame retardance rating according to UL94 at 0.25 mm, had an undesirably low HDT temperature of 97.8° C., and had a notched Izod impact strength of less than that of Examples 19 and 20. Example 23, which included 5 wt. % mineral filler and 7.5 wt. % phosphorous-containing flame retardant, exhibited improved flame retardance rating according to UL94, for example, at 0.25 mm, compared with Examples 21 and 22, had an undesirably low HDT temperature of 98.4° C., and had a notched Izod impact strength less than that of Examples 18-20.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function or objectives of the compositions, methods, and articles.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combinations" is inclusive of blends, mixtures, alloys, reaction products, and the like. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "an embodiment" means that a particular element described in connection with the embodiment is included in at least one embodiment described herein, and may or may not be present in other embodiments. In addition, it is to be understood that the described elements may be combined in any suitable manner in the various embodiments.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A thermoplastic composition comprising
40 to 70 weight percent of a polycarbonate;
15 to 50 weight percent of a polycarbonate-polysiloxane copolymer;
4 to 8 weight percent of a polyetherimide-polysiloxane copolymer;
1 to 8 weight percent of a mineral filler; and
2 to 5 weight percent of a phosphorous-containing flame retardant;
wherein the weight percentages are based on the total weight of the thermoplastic composition, and
wherein a total amount of polysiloxane from both the polycarbonate-polysiloxane copolymer and the polyetherimide-polysiloxane copolymer is 2 to 4 weight percent, based on a total weight of the thermoplastic composition.

2. The thermoplastic composition of claim 1, further comprising a fluoropolymer.

3. The thermoplastic composition of claim 1, comprising
50 to 60 weight percent of the polycarbonate; and
30 to 40 weight percent of the polycarbonate-polysiloxane copolymer.

4. A thermoplastic composition comprising
50 to 60 weight percent of a polycarbonate;
30 to 40 weight percent of a polycarbonate-polysiloxane copolymer;
4 to 8 weight percent of a polyetherimide-polysiloxane copolymer;
1 to 8 weight percent of a mineral filler; and
2 to 5 weight percent of a phosphorous-containing flame retardant;
wherein the weight percentages are based on the total weight of the thermoplastic composition, and
wherein
the polycarbonate comprises a tris(4-hydroxyphenyl)ethane branched polycarbonate resin,
the phosphorous-containing flame retardant comprises a phosphazene flame retardant,
the fluoropolymer comprises a styrene-acrylonitrile encapsulated polytetrafluoroethylene, and
the composition further comprises
phosphorous acid,
a phosphite stabilizer,
carbon black, and
an antioxidant stabilizer.

5. The thermoplastic composition of claim 1, wherein the mineral filler comprises talc, or talc having an average particle size less than or equal to 2.5 micrometers.

6. The thermoplastic composition of claim 1, wherein the mineral filler is present in an amount of 3 to 7 weight percent, based on the total weight of the composition.

7. The thermoplastic composition of claim 4, wherein a weight ratio of the phosphorous acid to the mineral filler is 0.01:1 to 0.03:1.

8. A film comprising the thermoplastic composition of claim 1.

9. The film of claim 8 having a thickness of 0.1 to 0.6 millimeters.

10. A thermoplastic composition comprising
40 to 70 weight percent of a polycarbonate;
15 to 50 weight percent of a polycarbonate-polysiloxane copolymer;
4 to 8 weight percent of a polyetherimide-polysiloxane copolymer;
1 to 8 weight percent of a mineral filler; and
2 to 5 weight percent of a phosphorous-containing flame retardant;
wherein the weight percentages are based on the total weight of the thermoplastic composition, and
wherein
the composition has a flame retardancy rating of V0 at a thickness of 0.5 millimeters according to UL94,
the composition has a flame retardancy rating of VTM0 at a thickness of 0.25 millimeters, determined in accordance with UL94,
a 3.2-millimeter thick molded Notched Izod Impact (NII) bar comprising the composition has a notched Izod impact strength of 750 J/m or greater, determined in accordance with ASTM D256-10(2018) at 23° C.,
a flat, 3.2-millimeter thick molded tensile bar formed from the composition has a Heat Deflection Test (HDT) temperature of 114° C. or greater, determined at 1.82 MPa per ASTM D648-2018,
the composition does not comprise potassium perfluorobutane sulfonate, the composition does not comprise a chlorine-containing flame retardant, and the composition does not comprise a bromine-containing flame retardant, or
a combination thereof.

11. The thermoplastic composition of claim 10, wherein the composition has a flame retardancy rating of V0 at a thickness of 0.5 millimeters according to UL94.

12. The thermoplastic composition of claim 10, wherein the composition has a flame retardancy rating of VTM0 at a thickness of 0.25 millimeters, determined in accordance with UL94.

13. The composition of claim 10, wherein a 3.2-millimeter thick molded Notched Izod Impact (NII) bar comprising the composition has a notched Izod impact strength of 750 J/m or greater, determined in accordance with ASTM D256-10 (2018) at 23° C.

14. The composition of claim 10, wherein a flat, 3.2-millimeter thick molded tensile bar formed from the composition has a Heat Deflection Test (HDT) temperature of 114° C. or greater, determined at 1.82 MPa per ASTM D648-2018.

15. The composition of claim 10, wherein the composition does not comprise potassium perfluorobutane sulfonate, wherein the composition does not comprise a chlorine-containing flame retardant, and wherein the composition does not comprise a bromine-containing flame retardant.

* * * * *